(12) United States Patent
Wiesenfarth

(10) Patent No.: US 8,594,458 B2
(45) Date of Patent: Nov. 26, 2013

(54) IMAGE PROCESSING METHOD, APPARATUS AND UNIT

(75) Inventor: Rainer Wiesenfarth, Stuttgart (DE)

(73) Assignee: INPHO GmbH, Stuttgart (DE)

(*) Notice: Subject to any disclaimer, the term of this patent is extended or adjusted under 35 U.S.C. 154(b) by 208 days.

(21) Appl. No.: 12/852,851

(22) Filed: Aug. 9, 2010

(65) Prior Publication Data

US 2011/0188778 A1 Aug. 4, 2011

Related U.S. Application Data

(63) Continuation of application No. PCT/EP2008/052432, filed on Feb. 28, 2008.

(51) Int. Cl.
*G06K 9/36* (2006.01)

(52) U.S. Cl.
USPC .......................................................... 382/284

(58) Field of Classification Search
None
See application file for complete search history.

(56) References Cited

U.S. PATENT DOCUMENTS

| | | | |
|---|---|---|---|
| 5,642,285 A | 6/1997 | Woo et al. | |
| 5,991,444 A | 11/1999 | Burt et al. | |
| 6,147,598 A | 11/2000 | Murphy et al. | |
| 6,282,362 B1 | 8/2001 | Murphy et al. | |
| 7,339,611 B2 | 3/2008 | Marold et al. | |
| 7,541,974 B2 | 6/2009 | Scherzinger | |
| 7,619,561 B2 | 11/2009 | Scherzinger | |
| 7,697,127 B2 | 4/2010 | Vogel et al. | |
| 7,719,467 B2 | 5/2010 | Norda et al. | |
| 2005/0125142 A1 | 6/2005 | Yamane | |
| 2008/0143744 A1* | 6/2008 | Agarwala | 345/629 |
| 2008/0253685 A1* | 10/2008 | Kuranov et al. | 382/284 |
| 2009/0138233 A1 | 5/2009 | Kludas et al. | |
| 2009/0220144 A1 | 9/2009 | Mein et al. | |
| 2009/0262974 A1 | 10/2009 | Lithopoulos | |
| 2010/0141759 A1 | 6/2010 | Scherzinger | |
| 2010/0172546 A1 | 7/2010 | Sharp | |
| 2010/0174507 A1 | 7/2010 | Vogel et al. | |

FOREIGN PATENT DOCUMENTS

| | | |
|---|---|---|
| CN | 1694118 A | 11/2005 |
| DE | 19922321 C2 | 7/2002 |
| EP | 1936323 A2 | 6/2008 |

(Continued)

OTHER PUBLICATIONS

Milgram, D.L.; , "Adaptive Techniques for Photomosaicking," Computers, IEEE Transactions on , vol.C-26, No. 11, pp. 1175-1180, Nov. 1977.*

(Continued)

*Primary Examiner* — Nirav G Patel
(74) *Attorney, Agent, or Firm* — Kilpatrick Townsend & Stockton LLP

(57) ABSTRACT

The invention relates to a method for selecting a seam between two overlapping images of an area of interest. It includes generating a difference value associated with each portion of the overlapping region, wherein the difference value associated with a portion is derived from the difference between at least one property of the portion in the two images It also includes selecting, through the overlapping region, a path between two points located at the edge of the overlapping region based on the sum of the difference values of the portions along the path. The path is set as the seam. The seam may be used for combining the overlapping images into one image. The invention also relates to a unit, an apparatus, a computer program and an image.

12 Claims, 12 Drawing Sheets

(56) References Cited

FOREIGN PATENT DOCUMENTS

| EP | 1944572 A1 | 7/2008 |
|---|---|---|
| WO | WO 2007/031248 A2 | 3/2007 |
| WO | WO 2009/100773 A1 | 8/2009 |
| WO | WO 2009/100774 A1 | 8/2009 |
| WO | WO 2009/103342 A1 | 8/2009 |
| WO | WO 2009/106141 A1 | 9/2009 |
| WO | WO 2010/080950 A1 | 7/2010 |

OTHER PUBLICATIONS

Milgram, D.L.; , "Computer Methods for Creating Photomosaics," Computers, IEEE Transactions on , vol.C-24, No. 11, pp. 1113-1119, Nov. 1975.*

Tekumalla, L.S.;, "Image Mosaicing," The University of Utah, Nov. 11, 2003.*

Cheng, "Vexcel UltraCam Image Correction Using Commercial Software: RMS Residual Errors Within 2 Inches or 5 cm at Ground Control Points," dated Jun. 11, 2006; retrieved from the Internet: <http://www.geoinformatics.com/asp/default.asp?t=article&newsid=2599> on Dec. 12, 2007, 6 pages total.

PCI Geomatics, "Image Mosaicking Fact Sheet", updated on Nov. 17, 2005; retrieved from the Internet: <http://www.pcigeomatics.com>, 2 pages total.

PCI Geomatics, "OrthoEngine Productivity Suite: Technical Specifications", updated on Dec. 8, 2005; retrieved from the Internet: <http://www.pcigeomatics.com>, 2 pages total.

PCI Geomatics, "Image Mosaicking"; retrieved from the Internet: <http://www.pcigeomatics.com/products/mosaicking.html2> on Dec. 12, 2007, 2 pages total.

PCI Geomatics, "OrthoEngine® Productivity Tools: Technical Specifications", updated on Feb. 28, 2003; retrieved from the Internet: <http://www.pcigeomatics.com>, 1 page total.

Milgram, "Adaptive Techniques for Photomosaicking," IEEE Transactions on Computers, Nov. 1977; 26(11):1175-1180.

Duplaquet, "Building Large Image Mosaics with Invisible Seam-Lines," Proc. SPIE, Jan. 1, 1998; 3387:369-377.

Soille, "Morphological Image Compositing," IEEE Transactions on Pattern Analysis and Machine Intelligence, May 2006; 28(5):673-683.

Szeliski, "Image Alignment and Stitching: A Tutorial," Microsoft Technical Report MSR-TR-2004-92, Dec. 10, 2006, can be retrieved from the Internet: <http://research.microsoft.com/pubs/70092/tr-2004-92.pdf>, 89 pages total.

Zomet et al., "Seamless Image Stitching by Minimizing False Edges," IEEE Transactions on Image Processing, Apr. 2006; 15(4):969-977.

International Search Report and Written Opinion of PCT Application No. PCT/EP2008/052432, mailed on Apr. 6, 2009, 14 pages total.

Office Action for corresponding Chinese patent application No. 2008801276331 dated Feb. 22, 2012, 2 pages.

Office Action for corresponding Chinese patent application No. 2008801276331 dated Nov. 28, 2012, 8 pages.

\* cited by examiner

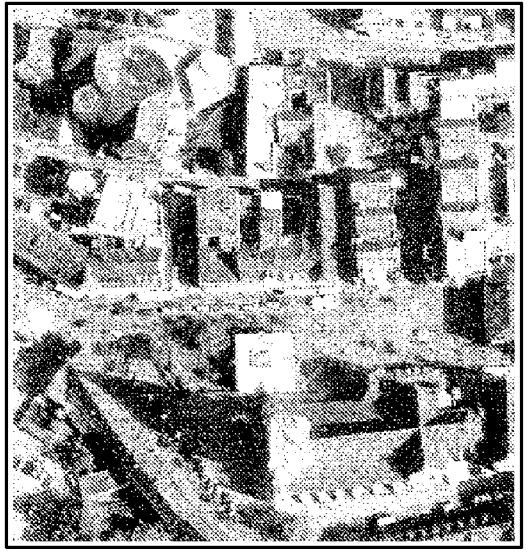 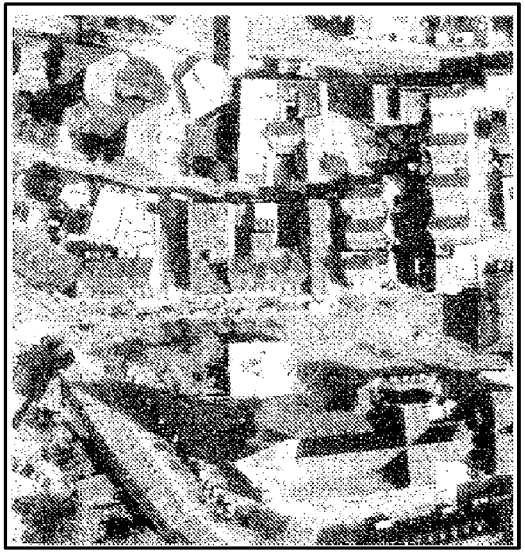
FIG. 4a    FIG. 4b
FIG. 5

IMAGE PROCESSING METHOD, APPARATUS AND UNIT

CROSS-REFERENCES TO RELATED APPLICATIONS

This application claims priority to and is a continuation of International Patent Application PCT/EP2008/052432, filed Feb. 28, 2008, the contents of which is hereby incorporated by reference in its entirety for all purposes.

BACKGROUND OF THE INVENTION

The present invention relates to methods, apparatuses, units and computer programs for processing images, notably for combining overlapping images of an area of interest. The invention may, for instance, be used in geographical information systems for urban planning, scientific investigation or environmental impact assessment.

In geographical information systems, it is often desirable to construct an image of an area of interest, for instance an aerial photograph, by combining a plurality of overlapping images obtained from different points, i.e., locations.

The image construction process generally first includes a geometric rectification of the images, such as a perspective correction. The perspective correction may also be carried out during exposure by an adapted correction lens. The rectification process produces orthorectified images. The images may also be subject to scaling, lens distortion correction, color or brightness correction, and the like.

The construction process then generally includes making the images correspond to an available digital terrain model (DTM), digital surface model (DSM) or digital elevation model (DEM), i.e., a digital representation of ground surface topography. A digital terrain model (DTM) is obtained by remote sensing or land surveying, for instance.

The image construction process finally includes combining the overlapping images, by alignment and superposition for instance.

Conventional methods for combining overlapping images from different locations may require additional processing to obtain a smooth combined image, i.e., a combined image with an unnoticeable transition between the original constituent images. This may be needed to cope with specific characteristics of the area of interest. This additional processing is often laborious and inefficient.

It is therefore desirable to provide an image processing method which solves or partially solves the above-mentioned problems. In particular, there is a need for providing a process for combining overlapping images of an area of interest which produces smoother combined images and which can be performed in an automatic manner, such as on a computer.

SUMMARY OF THE INVENTION

Such an image processing method is provided by claim 1. Advantageous embodiments are described in the dependent claims.

The image processing method of the invention is used for selecting a seam between two overlapping images of an area of interest, wherein the two images define an overlapping region. The method includes a generating procedure and a selecting procedure. In the generating procedure, a difference value associated with each portion of the overlapping region is generated. In other words, for each portion of the overlapping region, a difference value is generated. The difference value associated with a portion is derived from the difference between at least one property of the portion in the two images. Then, in a selecting procedure, a path is selected through the overlapping region between two points, each one located at the edge of the overlapping region. The selection, or creation, of the path is based on the sum of the difference values of the portions along the path. The path is set as the seam.

The method provides an automatic process for combining in an unnoticeable manner two overlapping images of an area of interest. The method is applicable to overlapping images containing an overlapping region wherein the same elements may be depicted in a different manner in the two images. The differences may include buildings or structures viewed from different angles, surfaces such as glass roofs or outside swimming pools reflecting the surroundings or the sky in a different manner, mobile objects or persons having different locations or positions in the two images, or the like.

A path, and thus a seam, is selected by taking into account the differences between the two images to avoid the portions of the overlapping region which present the most significant differences between the two images.

To this end, for each portion of the overlapping region, a difference value is derived from the differences between the properties of the portion in the two images. A set of difference values is therefore created. The set of difference values may take the form of a matrix or an array of difference values and may be called a cost grid. The portions in the cost grid associated with large difference values are said to be expensive, and should be preferably avoided by the path, while the portions associated with small difference values are said to be cheap, and need not be avoided by the path.

The path is then selected between two edge points of the overlapping region based on the sum of the difference values of the portions along the path. In one embodiment, a path is selected which minimizes the sum of the difference values of the portions along the path. In another embodiment, a path is selected which minimizes the sum of the difference values of the portions along the path divided by the number of portions along the path. The obtained path is then chosen as the seam.

The seam is a line along which the two images may be combined. In one embodiment, when combining the images, the portions on one side of the seam are taken from a first one of the images while the portions on the other side of the seam are taken from the second one of the images. In one embodiment, the seam is used for combination in such a manner that the portions on one side of the seam get a major fraction (more than 50 percent) of their properties from the first image, while portions on the other side of the seam get a major fraction of their properties from the second image.

A portion of the overlapping image may be a pixel, a group of pixels or any kind of segment of the image.

The method of the invention provides adequate seams along which two images may be combined, in a substantially unnoticeable manner, while enabling an automatic and efficient execution without human intervention, thus reducing the time and costs involved in producing combined images.

In one embodiment, before the generating and selecting procedures, the overlapping images are geometrically rectified. This may be necessary, unless the images are rectified at the time of recording, for instance, by perspective correction lenses inside the camera.

In one embodiment, a digital terrain model (DTM) or a similar spatial or topographic reference is used before the generating and selecting procedures to make each one of the two overlapping images correspond to the spatial reference and to make the images correspond to each other. The overlapping region may then be suitably processed with points or portions spatially corresponding to each other in the two images.

In one embodiment, the difference value associated with each portion, and on which the selection of a path is based, is the difference between the radiometric values of the portion in the two images. In another embodiment, the difference value is based on the difference between the gradient of the radiometric values at the portion in the two images. In yet another embodiment, the difference value is based on a combination of the two preceding differences.

Taking into account the differences between the radiometric values of corresponding portions in the two images is advantageous for selecting a path avoiding, as far as possible, the parts of the overlapping region presenting the most significant differences in absolute radiometric values. This enables a smooth combination. Taking into account the differences between the gradient of the radiometric values at corresponding portions in the two images is advantageous for selecting a path avoiding, as far as possible, edges being at different locations (e.g., being shifted) in the images. An edge may for instance be the periphery of a roof or the periphery around a mobile object. Taking into account the gradient of radiometric values instead of the absolute radiometric values is advantageous to cope with a possible radiometric offset. Such an offset, applicable to all portions of an overlapping region, is a constant difference in absolute radiometric value between corresponding portions in the two images. Such an offset may be caused by the characteristics of the image recording or photographic process, for instance the exposure parameters.

One embodiment provides, as basis for the difference values, a combination of the difference between the absolute radiometric values and the difference between the gradient of the radiometric values of the portion in the two images. This leads to a cost grid compromising between putting too much weight in avoiding the areas presenting significant differences, which may result from offsets, and avoiding edges, without taking into account spatially persistent differences.

In one embodiment, the path is selected between two points each located, at the intersection between the edges of the two images. In other words, the start and end points of the path both lie at the periphery of the overlapping area, and they each have a neighbor point lying exclusively in a first one of the images but not in the other, and another neighbor point lying exclusively in the other image but not in the first one. This enables to easily combine the two images without the need for making further decisions and therefore enables a convenient computer implementation while reducing execution time.

In one embodiment, the selecting procedure includes selecting the path along which the sum of the difference values is the smallest or the smallest known. A shortest path algorithm, such as a standard Dijkstra shortest path search algorithm, may be used. By shortest, it is meant that a path minimizing the sum of the difference values is selected. If the set of difference values is viewed as a cost grid, the shortest path is a synonym of the cheapest path. Some of these algorithms are well known. The method of this embodiment may therefore be easily implemented. The method is not limited to the Dijkstra method, but any shortest path, search method may be used.

In one embodiment, in the selecting procedure, i.e., for selecting the path between the two points, the position of the portions along the path within the overlapping region is taken into account. This gives more weight to the paths passing through the middle of the overlapping region.

In one embodiment, the selecting procedure is additionally based on, i.e., additionally takes into account, information pertaining to structure of the area of interest, herewith called structural information. The structural information may be received or obtained from an external source, such as from a human intervention. The structural information may be associated with some or all portions of the overlapping region. The structural information may include building footprints.

This offers the opportunity to force the path to avoid certain parts of the overlapping region, such as massive buildings known to be located at some places in the DTM. For the portions of the overlapping region associated with structural information, a large number may be added to the generated difference value. This embodiment enables to reduce computer processing time by accelerating the execution of the selecting procedure, such as the shortest path identification.

In one embodiment, the method includes, after selecting the seam, a combining procedure for combining the two overlapping images along the seam.

The combining procedure may include blending the images along the seam, i.e., taking into account the properties of the portions of both images on both sides of the seam to operate a gradual merge of the images.

The invention also relates to a method for combining a set of overlapping images, in particular more than two overlapping images. The method includes a mosaicing procedure applied on the set of images.

The mosaicing procedure first includes determining whether the set of overlapping images comprises exactly two images. If so, the two overlapping images are combined into one image using the above-described method which includes a combining procedure.

The mosaicing procedure also includes determining whether the set of overlapping images comprises more than two images. If so, the set of overlapping images is first split into two subsets Then, the mosaicing procedure is applied on each one of the two subsets to obtain two images. Each subset is treated as a set when applying the mosaicing procedure at this stage. The two obtained images are then combined into one image using the above-described method, which includes a combining procedure.

This method enables to combine a large number of overlapping images into one image. The process is recursive, lends itself well to convenient computer implementation and fast execution. The set of images is split repetitively and the images are combined to build a mosaic, not showing any noticeable seam, as far as possible.

The invention also relates to an image processing unit, to an image processing apparatus, and to a computer program. The computer program is configured to carry out the above described methods, when executed on a computer or a programmable apparatus. Advantageous embodiments are described in the dependent claims.

The image processing unit is configured for selecting a seam between two overlapping images of an area of interest. The images define an overlapping region. The image processing unit includes a generating unit and a selecting unit. The generating unit is configured for generating a difference value associated with each portion of the overlapping region. In the generating unit, the difference value associated with a portion is derived from the difference between at least one property of the portion in the two overlapping images. The selecting unit is configured for selecting, through the overlapping region, a path between two points located at the edge of the overlapping region, based on the sum of the difference values of the portions along the path. The image processing unit is configured so that the path is set as the seam.

In one embodiment, the image processing unit is further configured for combining the two overlapping images into one image, and further includes, to this end, a combining unit configured for combining the images along the seam.

The invention also relates to an image processing apparatus configured for combining a set of overlapping images. The image processing apparatus includes a mosaicing unit configured for carrying out a mosaicing procedure.

The mosaicing procedure takes as input the set of overlapping images, and includes determining whether the set comprises exactly two images, and, if so, combining the two images into one image using the unit described above.

The mosaicing procedure also includes determining whether the set comprises more than two images. If so, the set is split into two subsets of images. The mosaicing procedure is then applied on each one of the two subsets of images to obtain two images. Finally, the two obtained images are combined into one image using the above described image processing unit including a combining unit.

The invention also relates to an image of an area of interest obtained by combining at least two overlapping images of the area of interest according to the method described above, using the unit described above, or using the apparatus described above. The at least two overlapping images combined to obtain the image at least include differences due to the location from which the images have been obtained, i.e., recorded.

BRIEF DESCRIPTION OF THE DRAWINGS

Embodiments of the present invention shall now be described, in conjunction with the appended figures, in which:

FIGS. 4a and 4b show two exemplary cutouts of a first and second image respectively, within their overlapping region, both showing the same geographical area;

FIG. 5 illustrates an exemplary cost grid of the area shown in FIGS. 4a and 4b, wherein the cost grid includes a combination of differences of absolute radiometric values and differences of gradient radiometric values;

DETAILED DESCRIPTION OF THE INVENTION

The present invention shall now be described, in conjunction with specific embodiments. It may be noted that these specific embodiments serve to provide the skilled person with a better understanding, but are not intended to in any way restrict the scope of the invention, which is defined by the appended claims. In particular, the embodiments described independently throughout the description can be combined to form further embodiments to the extent that they are not mutually exclusive.

Figure 1:
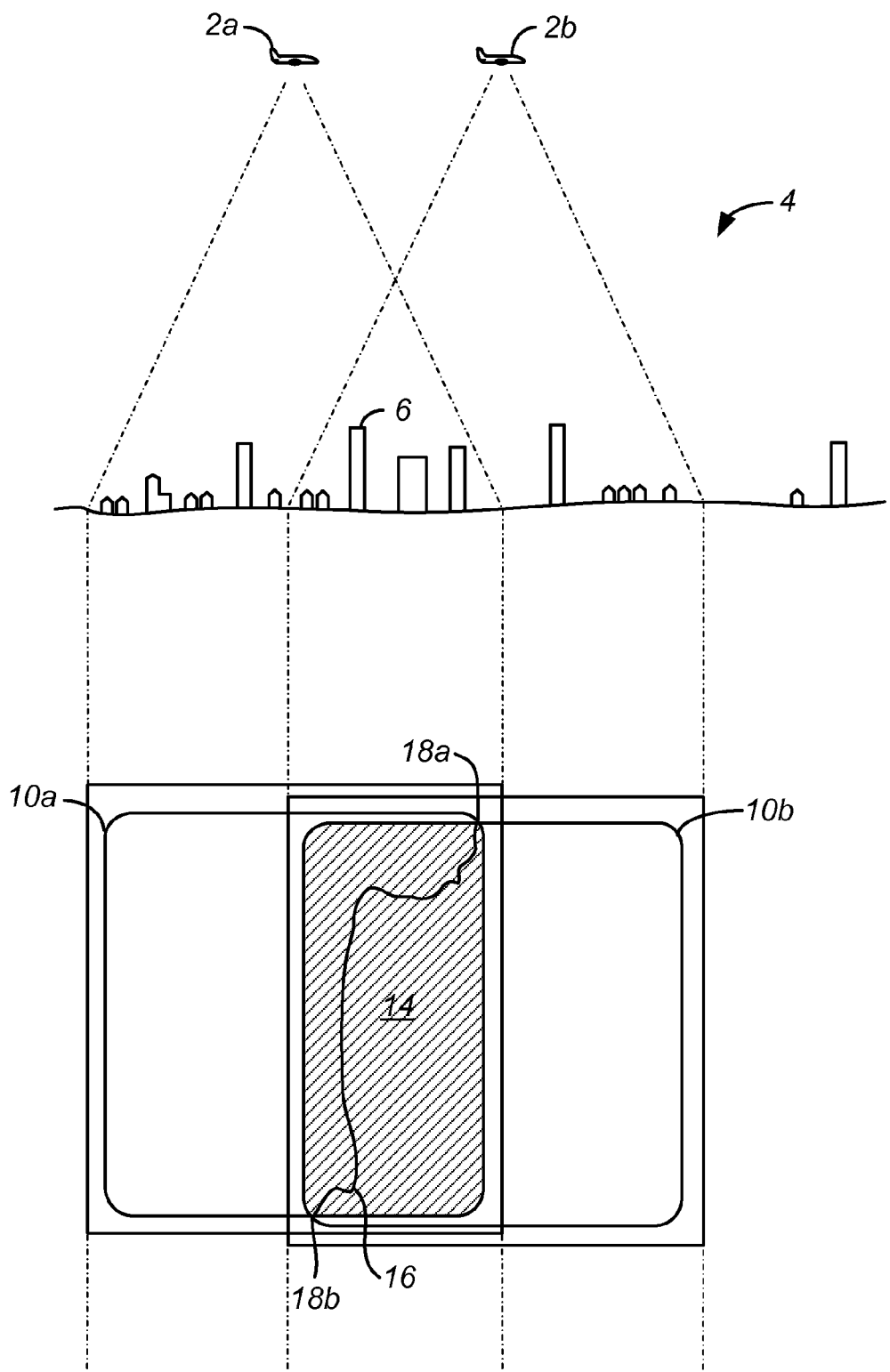
FIG. 1 schematically illustrates the process of obtaining two overlapping images of an area of interest, to illustrate the method according to the invention.

FIG. 1 schematically illustrates the process of obtaining, i.e., recording, two overlapping images 10a, 10b in one embodiment of the invention. The top part of FIG. 1 shows a side view of the process of recording images of an area of interest from two points 2a, 2b. The bottom part of FIG. 1 shows the two corresponding overlapping images 10a, 10b.

Two images 10a, 10b are recorded from an aircraft, such as a plane, a helicopter, a balloon, and airship (dirigible), a rocket, a kite, or the like, from two different locations 2a, 2b above the ground. The images 10a, 10b may also be satellite images. The area of interest 4 may be an urban area, as schematically shown in the top part of FIG. 1. The urban area includes a building 6. The building 6 is likely to be represented differently on the two images 10a, 10b taken from the two locations 2a and 2b respectively.

As illustrated in the bottom part of FIG. 1, the images 10a, 10b may not necessarily form a square. A peripheral portion of the actual recorded images (the two squares illustrated in the bottom part of FIG. 1) may be unusable or unused for some reasons. As also shown in the bottom part of FIG. 1, the images 10a and 10b share an overlapping region 14 (light-grey hatched area). The invention notably includes selecting a path 16 through the overlapping region 14, the path 16 going from a start point 18a to an end point 18b. The start point 18a and the end point 18b may be interchanged. The start point 18a and the end point 18b are both at an intersection between the periphery of the images 10a, 10b.

While the description is herewith made in the context of aerial photography, the invention is applicable to any context where two images of an area, a region, a target, a volume or an object of interest are recorded, where the two images overlap, and where there is a need for finding a seam between the images to combine them along the seam. The invention is also applicable to infrared imaging, radar or sonar imaging, seabed surveying, medical imaging, ultrasound imaging, magnetic resonance imaging, radiography imaging, ground-penetrating radar imaging, observational astronomy, etc.

While the description is herewith made for images 10a, 10b taken from different locations 2a, 2b, the invention may be applied to images taken from the same point.

Figure 2:
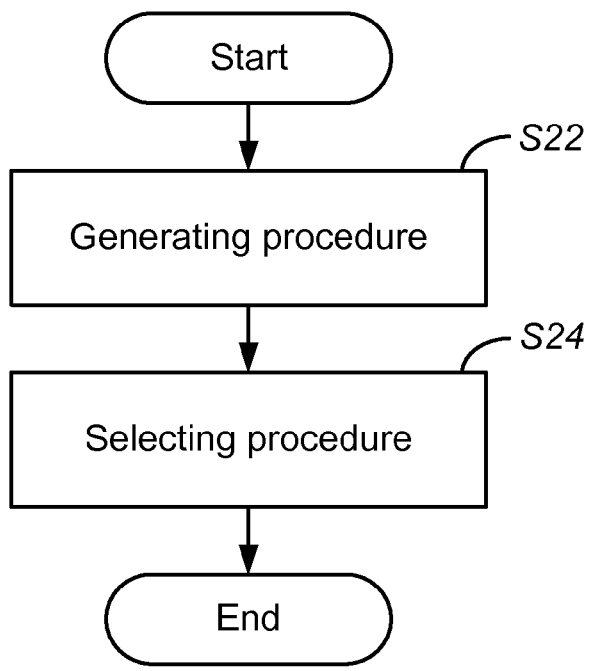
FIGS. 2 and 3 schematically illustrate flow charts of two embodiments of the method according to the invention.

FIG. 2 illustrates the flow chart of one embodiment of the method according to the invention. The method is applied on a pair of overlapping images 10a, 10b.

In a generating procedure S22, a difference value associated with each portion of the overlapping region 14 is generated. A set of difference values is therefore generated, which may take the form of a cost grid. The difference value associated with each portion is derived from the difference between at least one property of the portion in the two images 10a, 10b. The generating procedure S22 includes computing a cost grid for each pixel (or more generally a portion) of the overlapping region 14 by computing for each of these pixels the difference between the radiometric value, or the gradient of the radiometric value, in the two overlapping images 10a, 10b.

In one embodiment, the relation between the differences of radiometric values of a portion in the two images 10a, 10b, and the cost associated with the portion for the sake of the search path process, is linear. In another embodiment, the relation is non-linear.

The difference values may be computed based on the radiometric values, such as the three R53 (red, green and blue) components, the three YUV (luma information (Y) and color information (t and V)) components or the like, but may also consist of multiple gray channels (as for some satellite imagery).

In one embodiment, a portion is associated with additional properties derived from the radiometry of the portion itself and its neighbors. This may be, but is not limited to, values calculated by an edge detection filter.

In one embodiment, a portion is associated with additional properties derived from its position within the overlapping area 14, such as the distance between the portion and the edge of the overlapping area 14.

The generating procedure S22 may take as inputs the result of a procedure for determining the overlapping area 14, and the result of rectification process, as already described above. That is, in one embodiment, the generating procedure S22 takes as input orthographic images. Elements of an image which are not part of the digital terrain model (DTM) used as spatial reference (for instance because the DTM has a limited accuracy) may not be properly rectified, thus requiring additional processing before combining the images.

The determination of the overlapping area 14 (not illustrated) may be as follows. The first step is to determine the area covered by both images 10a, 10b. This is done on a per-pixel basis. Based on the geographic reference information of the whole image, the geographic reference for each single pixel is calculated. The overlapping area then includes the pixels corresponding to the same geographic reference information.

The method also includes a selecting procedure S24. The procedure S24 includes selecting through the overlapping region 14, a path between two points 18a, 18b located at the periphery of the overlapping region 14 based on the sum of the difference values of the portion along the path. In one embodiment, the set of difference values is used as a distance function for a shortest path search. The same set of difference values may be used to decide on a per-portion or per-pixel basis whether blending should be used.

Finally, the path is set as, i.e., taken as, the seam 16. In one embodiment, the path resulting of the shortest path search is used as the seam 16. The seam 16 may therefore be identified automatically, i.e., without human intervention.

In one embodiment, structural information, described above, may be added to the cost grid to alter it. The structural information may be provided through a user interface. In another embodiment, only radiometric values are taken into account to compute the cost grid.

In one embodiment, the generating procedure S22 is based on a cost grid having a lower resolution than the pixel resolution. That is, the portions are groups of pixels. This reduces computation time.

In one embodiment, finding the start point 18a and the end points 18b is done, either before or after the cost grid is generated S22, as follows. The overlapping area 14 is searched for a number of points where the seam 16 has to pass regardless of the cost data. All these points have to meet these three criteria:
(i) the point lies on the border of the overlapping area 14,
(ii) a neighbor of the point lies inside the "left" image, but outside the "right" image, and
(iii) another neighbor of the point lies inside the "right" image, but outside the "left" image.

Usually this approach results in two points, but in some cases the approach may produce no point at all, or four or more points. However, the number of points is always an even number. In any case, the problem can be reduced to finding a seam 16 through the cost grid using two points that act as start point 18a and end point 18b of the seam 16.

Figure 3:
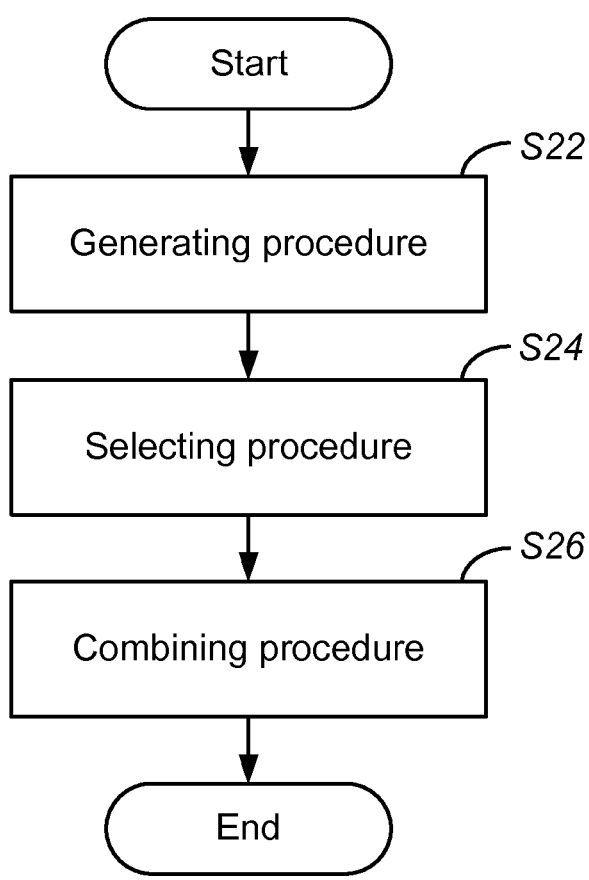

FIG. 3 illustrates a flow chart of the method according to the invention, which further comprises a combining procedure S26 for combining the two overlapping images 10a, 10b along the selected seam 16, obtained by the selecting procedure S24. An optional blending may be performed during the combining procedure S26 to obtain a smoother image combination, i.e., a smoother and less noticeable transition between the two combined images 10a, 10b.

The blending aims at avoiding a sharp noticeable transition between the two images 10a, 10b after combination. Some portions close to the seam 16 are blended between the two images 10a, 10b, rather than simply taken from one of the images 10a, 10b.

The already available cost grid may be used to decide if a portion is to be blended or simply assigned. If the difference value for this portion is below a given limit, the portion is blended. Otherwise, the portion is taken fully from the image from which it gets its major fraction.

For portions to be blended, the blending ratio may be calculated based on the distance to the nearest portion fully taken from the first image 10a and on the distance to the nearest portion fully taken from the second image 10b. In a simple embodiment, the blending ratio is linear to the distances, but it may also use a higher order function.

The blending values may be calculated for each image separately, so each portion has two values: one for the first image 10a and one for the second image 10b.

The blending values may be scaled to be in the range from 0.0 to 1.0 and then interpreted as alpha values used to combine the images 10a, 10b.

The alpha value for a portion of an image is determined by interpolation from the alpha values of the surrounding portions. The portion of the combined image is then the alpha-weighted sum of the portions of the first image 10a and the second image 10b. As the sum of the two alpha values need not be equal to 1.0, a final scaling is done to reach an alpha value of 1.0 for each pixel of the combined image.

FIGS. 4a and 4b show two exemplary overlapping regions (or parts thereof) of the same area of interest. Differences due to the locations from which the two images have been taken are visible. For instance, the church tower at the bottom of the images is clearly depicted differently, despite rectification and scaling.

FIG. 5 shows an exemplary cost grid, or set of difference values, computed by combining the differences between the absolute radiometric values of the images of FIGS. 4a and 4b and the differences between the gradient radiometric values in each of the images of FIGS. 4a and 4b. As apparent, some edges of the church roof are attributed large difference values (white values in FIG. 5). These edges will preferably be avoided during the selecting procedure S24 in the shortest path search. Generally, the portions or pixels with large difference values should preferably be taken from only one image, i.e., the seam 16 should avoid these portions.

Figure 6A:
FIGS. 6a and 6b illustrate two exemplary cost grids, the first one in gray scale, and the second one in bi-level, both only showing radiometric differences.
Figure 6B:

FIGS. 6a and 6b illustrate two exemplary cost grids, the first one in grayscale, and the second one in hi-level, both only showing radiometric differences. That is, the cost grid, or set of difference values, is computed based on the differences between the absolute radiometric values of the images of FIGS. 4a and 4b. The bright, sharp edges of the church roof in FIG. 5 are no longer apparent. The cost grids of FIGS. 6a and 6b are advantageous when there is no offset.

Figure 7:
FIG. 7 illustrates the calculated seam (black), the grid cells assigned to the first image light gray), the grid cells assigned to the second, image (dark gray), and the grid cells to be interpolated by blending (in white), resulting from applying one embodiment of the method of the invention to the overlapping images of FIGS. 4a and 4b.

FIG. 7 illustrates the calculated seam 16 (in black) after the generating and selecting procedures S22, S24. The calculated seam 16 is selected based on the cost grid of FIG. 5. FIG. 7 also shows the portions to be assigned to the first image of FIG. 4a (light gray) in the resulting combined image, the portions to be assigned to the second image of FIG. 4b (dark gray) in the resulting combined image, and the portions to be interpolated by blending (in white), As illustrated, the calculated seam reasonably avoids all areas depicted differently in the two images.

Figure 8A:
FIGS. 8a and 8b show an exemplary per-image alpha grid of the first and second images of FIGS. 4e and 4b prior to interpolation, i.e., blending, wherein white cells represent alpha values of 1.0, black cells represent alpha values of 0.0 and gray cells those subject to interpolation.
Figure 8B:

FIGS. 8a and 8b show an exemplary per-image alpha grid of the first and second images of FIGS. 4a and 4b prior to interpolation, i.e., blending, wherein the white cells (or portions) represent alpha values of 1.0, the black cells represent alpha values of 0.0, and the gray cells are subject to interpolation.

Figure 9A:
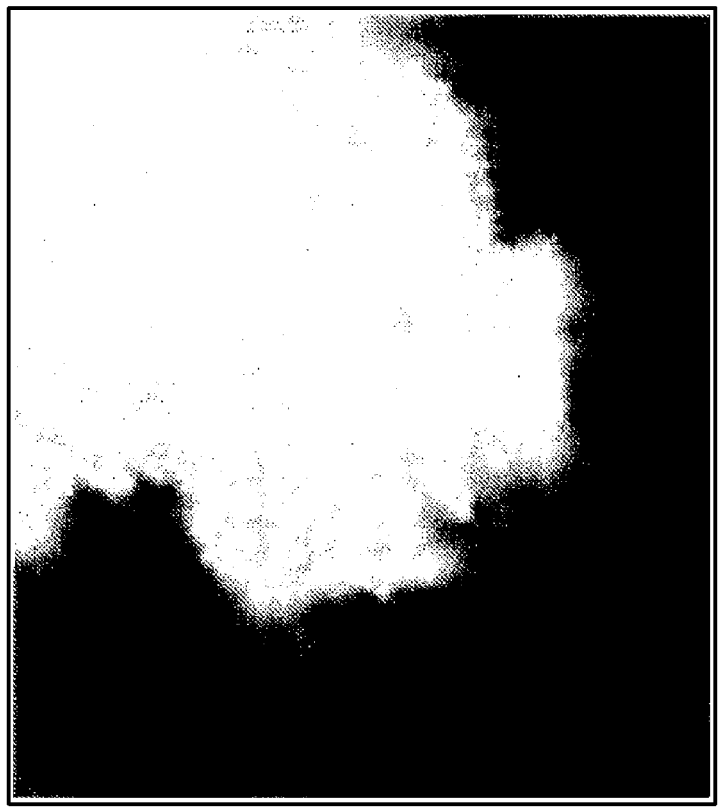
FIGS. 9a and 9b show exemplary per-image alpha grid of the first image and the second image respectively after interpolation (blending), wherein the brighter values represent the larger alpha (weight) values, with a maximum value of 1.0 and a minimum value of 0.0.
Figure 9B:
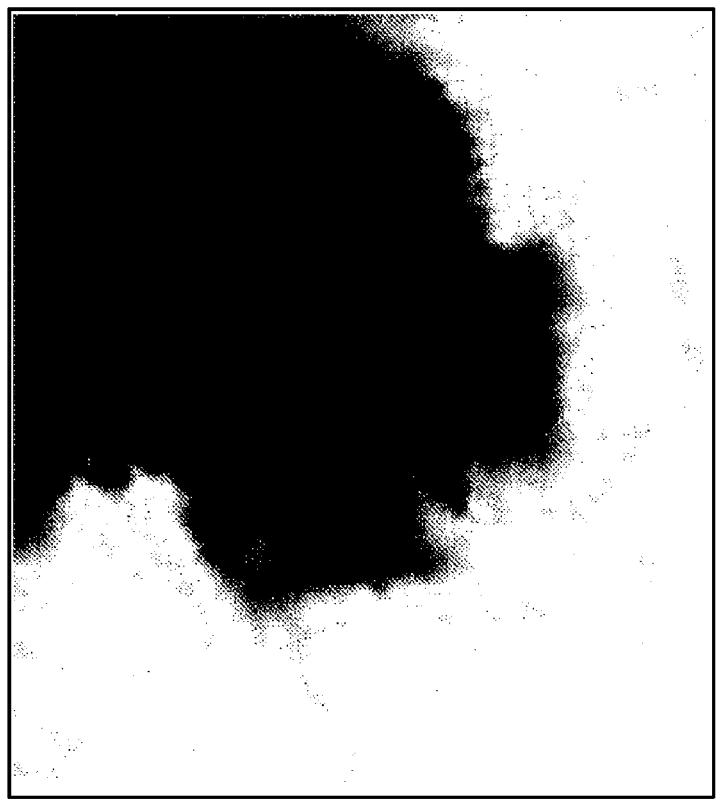

FIGS. 9a and 9b show an exemplary per-image alpha grid of the first image and the second image respectively after interpolation (blending), wherein the brighter values represent the larger alpha (weight) values, with a maximum value of 1.0 and a minimum value of 0.0. The portions of the overlapping region 14 presenting large radiometric differences in the images 10a, 10b are assigned almost exclusively to one or the other images without blending, even when close to the seam 16. The illustrated per-pixel blending takes into account the distance between each pixel and the seam 16.

Figure 10:
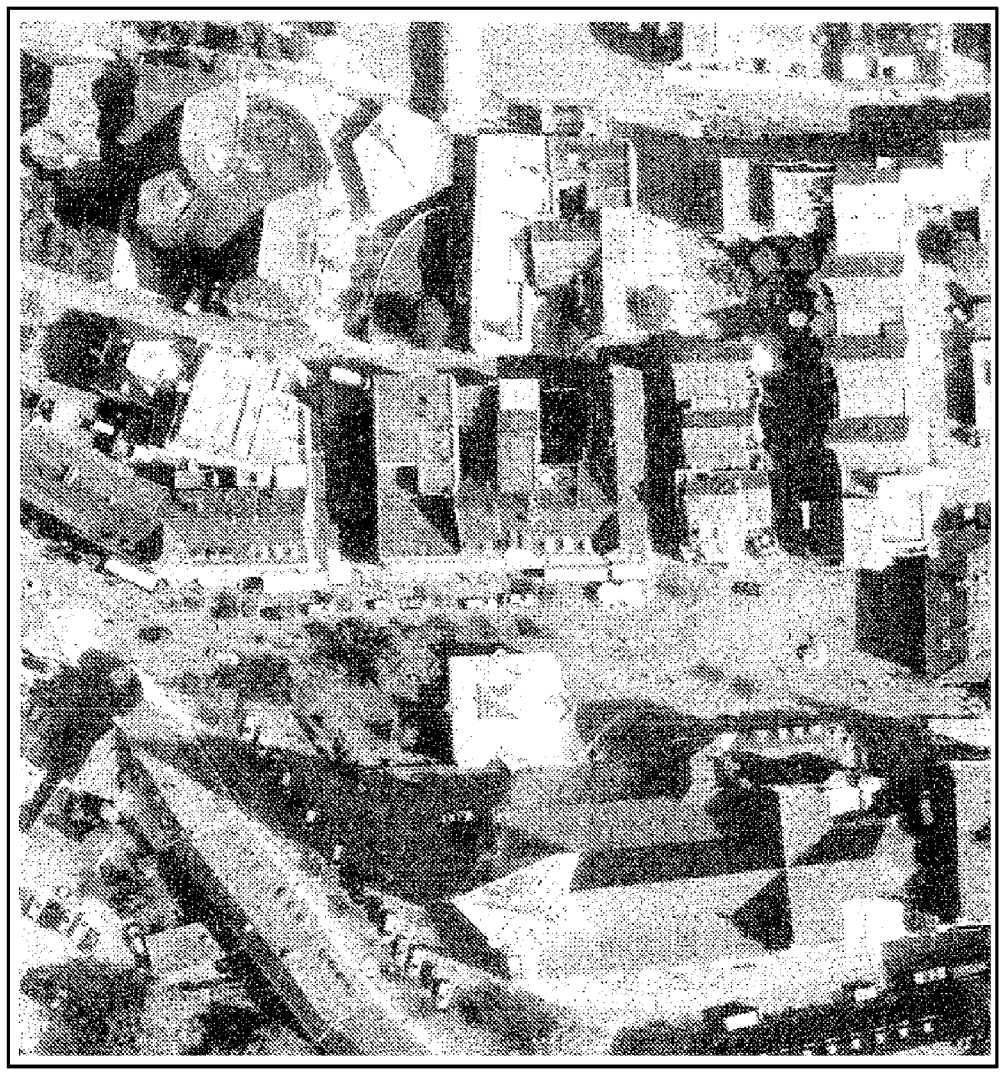
FIG. 10 illustrates an exemplary final mosaic after blending the two overlapping images of FIGS. 4a and 4b according to the alpha grid values.

FIG. 10 shows an exemplary final mosaic, i.e., combined image, after rectification, scaling, finding the overlapping region 14, finding the start point 18a and end point 18b, applying the generating procedure S22, applying the selecting procedure S24, and applying the combining procedure S26 including blending. The shown image combines the two overlapping images of FIGS. 4a and 4b according to the alpha grid values.

Figure 11:
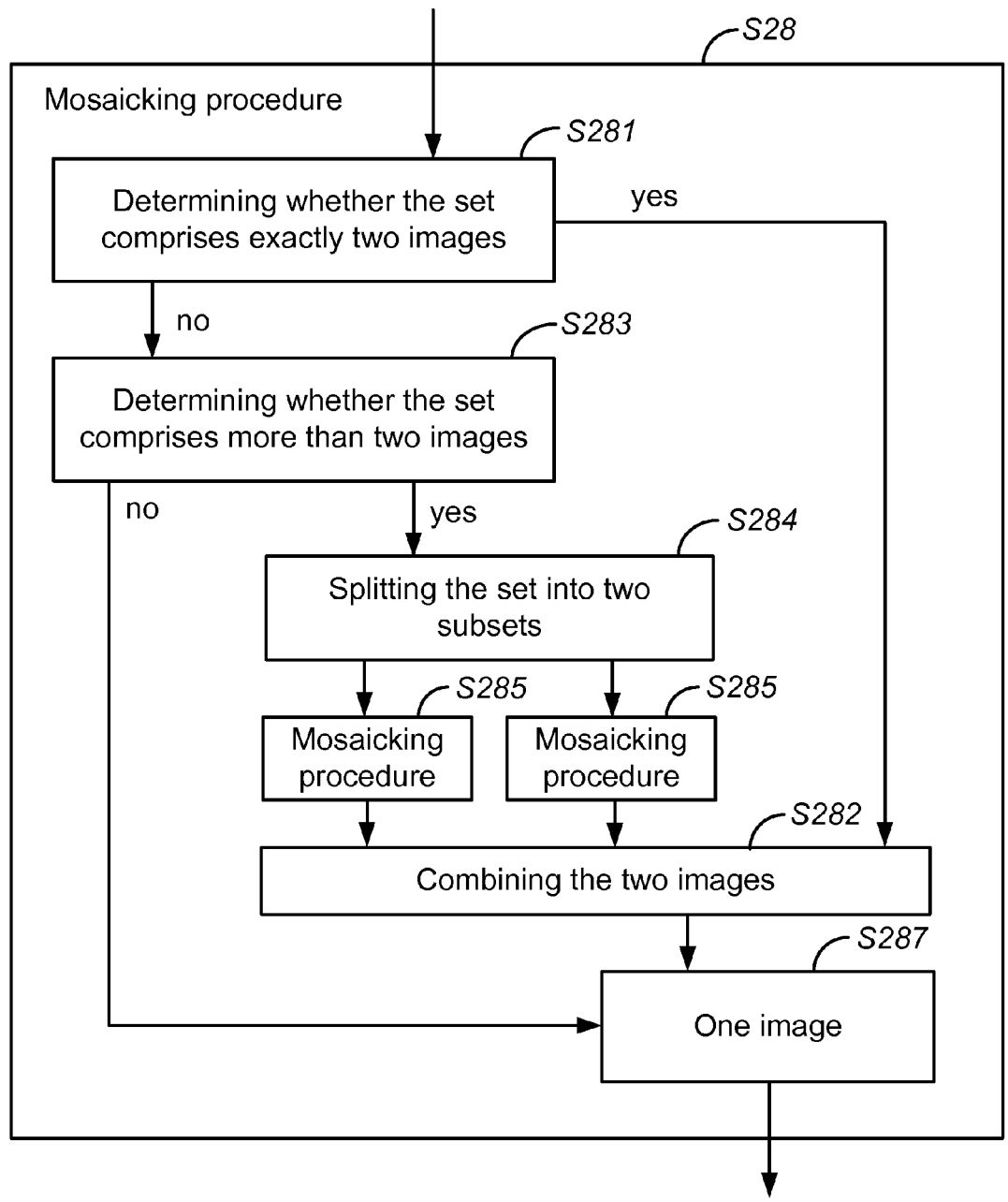
FIG. 11 illustrate a flow chart of a. mosaicing procedure according to one embodiment of the method of the invention for combining a set of overlapping images.

FIG. 11 illustrates a schematic flow chart of a mosaicing procedure S28 of a method according to one embodiment of the invention. The mosaicing procedure S28 extends the procedures illustrated in FIGS. 1, 2 and 3 to combine more than two images of an area of interest 4. The purpose of the mosaicing procedure S28 is to build a mosaic from an arbitrary number of images in such a manner that the seams between the images are not visible or substantially not visible. The number of images is not limited. When the resulting mosaic exceeds the size of commonly used image formats, Conventional tiling methods may be used to store the resulting image.

The mosaicing procedure S28 starts with step S281 as illustrated by the incoming downwards arrow at the top of FIG. 11. Step S281 consists in determining whether the set of overlapping images 10 comprises exactly two images. If so ("yes"), there is no need for further partitioning, and the two images 10a, 10b are combined S282 by using the above-described method illustrated in FIG. 3. One image is then obtained S287 and the mosaicing procedure S28 is completed.

If the result of the step S281 is negative, i.e., if there are more than or less than two images but not exactly two images ("no"), whether the set of overlapping images comprises more than two images 10 is determined S283.

If the result of step S283 is negative ("no"), the set comprises only one image and the image is the mosaic. The mosaicing procedure S28 is therefore completed.

If step S283 results in a positive determination ("yes"), i.e., if there are more than two images, the set is split S284 into two subsets. A mosaicing procedure S285 is then applied on each one of the two subsets. This is a recursive procedure. At this stage, the mosaicing procedure S285 is applied on each one of the two subsets by treating them as if each subset was a set. When both mosaicing procedures S285 are completed on each subset, the two obtained images are combined S282. The combination S282 is carried out using the above-described method illustrated in FIG. 3. One image is then obtained S287, and the mosaicing procedure S28 is completed.

The step S284 of splitting the set of images into two subsets, when the set comprises more than two images, may be performed based on the set's geometric extent. For instance, if the area covered by the set is higher than wide, the set is split by cutting it along a horizontal line. All images that are predominantly above the horizontal line are part of the first subset and all the images 10 which are predominantly below the horizontal line are part of the second subset. As another example, if the area covered by the set is wider than high, the set is split by cutting it along a vertical line. All images that are predominantly on the left-hand side of the vertical line are part of the first subset and the remaining images 10, i.e., those predominantly on the right-hand side of the vertical line, are part of the second subset.

In one embodiment, the step S284 of splitting includes dividing the initial set of images into two subsets of images in such a manner that the overlapping region between the two subsets is as small as possible. This reduces computer memory usage and managing cost during the step S282 of combining the two images mosaicked from the two initial subsets.

FIG. 11 illustrates an embodiment of the invention. Yet other embodiments are within the scope of the invention. In one embodiment, a unique step of determining how many images make the set may be used instead of the two steps S281, S283.

Figure 12:
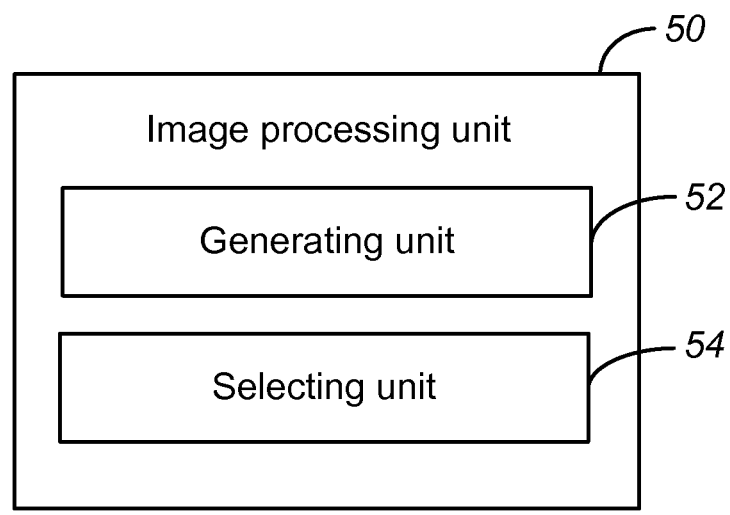
FIGS. 12 and 13 schematically illustrate two image processing units according to embodiments of the invention.

FIG. 12 illustrates an image processing unit 50, such as a computer-implemented image processing unit, comprising a generating unit 52 and a selecting unit 54. The image processing unit 50 is configured for selecting a seam 16 between two overlapping images 10a, 10b of an area of interest 4. The images 10a, 10b define an overlapping region 14.

The generating unit 52 is configured for generating a difference value associated with each portion of the overlapping region 14. The generating unit 52 is configured so that the difference value associated with a portion is derived from the difference between at least one property of the portion in the two images 10a, 10b. That is, a cost grid is generated, as explained above with reference to the generating procedure S22.

The selecting unit 54 is configured for selecting, through the overlapping region 14, a path between two points 18a, 18b located at the edge of the overlapping region 14 based on the sum of the difference values of the portions along the path. For instance, the shortest path, or a short path, is identified, as explained above with reference to the selecting procedure S24.

The image processing unit 50 is further configured so that the path is set as the seam 16. The seam 16 may be used for combining the two images.

Figure 13:
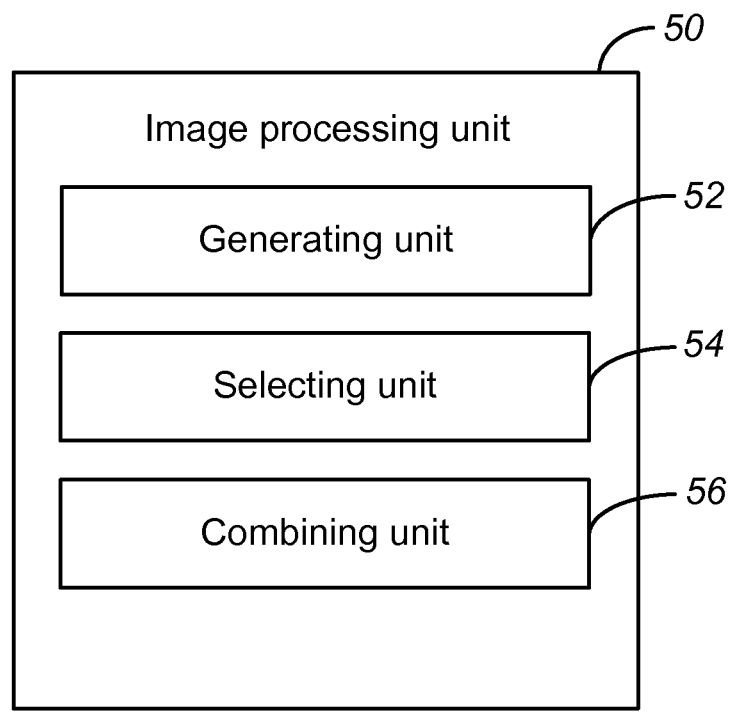

FIG. 13 illustrates an image processing unit 50 according to another embodiment of the invention. The image processing unit 50 of FIG. 13 differs from the image processing unit 50 of FIG. 12 in that it further includes a combining unit 56 for combining the two overlapping images 10a, 10b along the selected seam 16. This may for instance be done in the same manner as described above with reference to the combining procedure S26.

Figure 14:
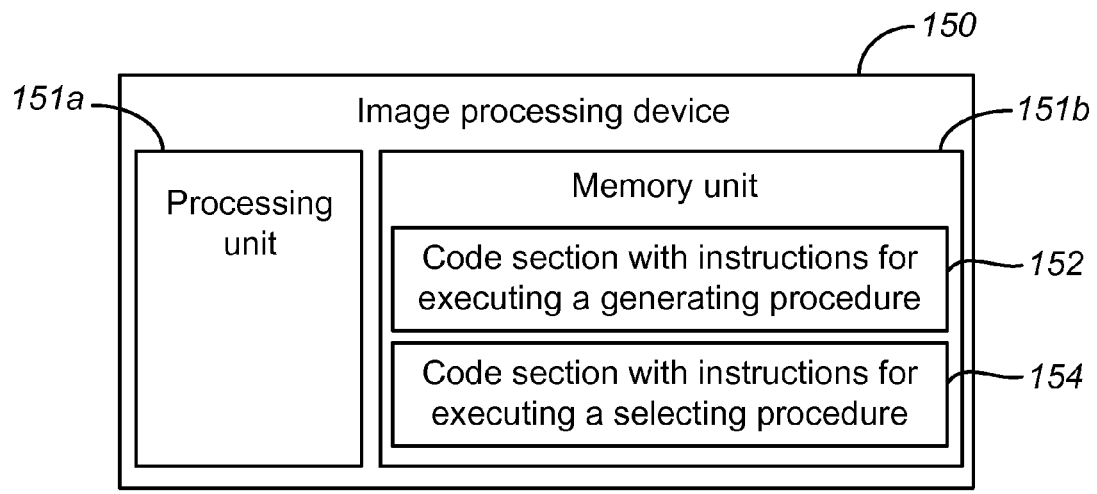
FIGS. 14 and 15 schematically illustrate two image processing devices according to embodiments of the invention.

FIG. 14 schematically illustrates an image processing device 150 according to one embodiment of the invention. It includes a processing unit 151a, such as a computer processing unit (CPU), and a memory element 151b, such as a memory disk, an optical disk, a flash memory, a magnetic tape, a random access memory (RAM), a read-only-memory (ROM), a programmable ROM (PROM), an erasable PROM (EPROM), an electrically erasable PROM (EEPROM), any combination thereof, or the like. The memory element 151b includes a code section 152 with instructions for executing, on the processing unit 151a, a generating procedure as described above and a code section 154 with instructions for executing a selecting procedure as described above.

The image processing device 150 may also for instance be executed or implemented using a computer processing unit (CPU), an ASIC (application-specific integrated circuit), a FPGA (field-programmable gate array), any combination thereof, or the like.

The image processing device 150 may for instance be a computer, a laptop, a mobile terminal, a personal digital assistant (Pak.), a handheld device, or the like.

Figure 15:
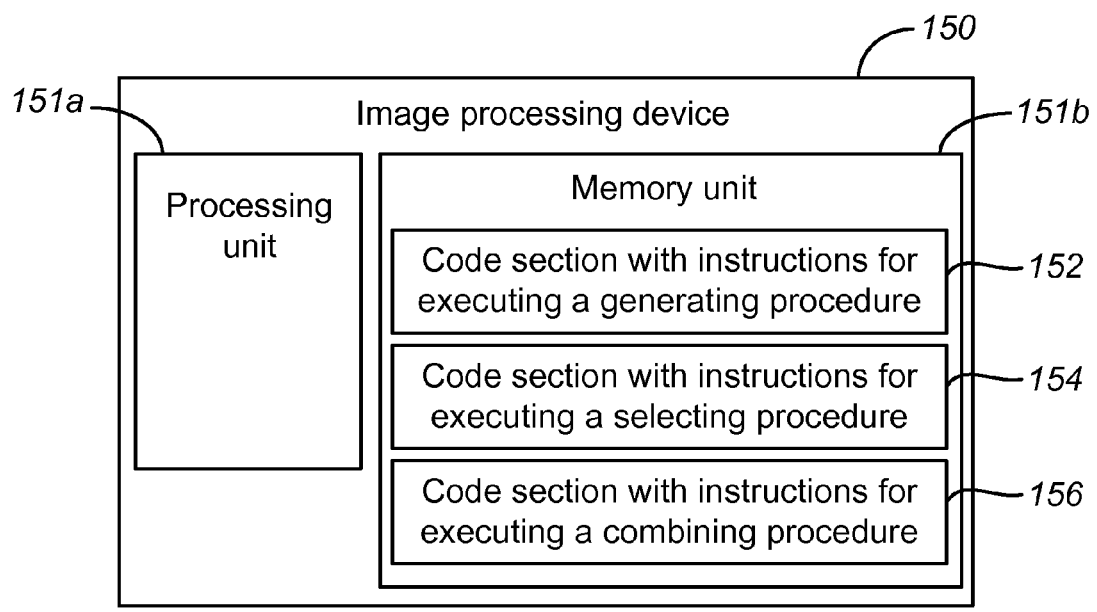

FIG. 15 schematically illustrates an image processing device 150 according to a further embodiment of the invention. The image processing device 150 of FIG. 15 differs from the image processing device 150 of FIG. 14, in that the memory element 151b thereof further includes a code section 156 with instructions for executing a combining procedure as described above.

In one embodiment, the method of the invention includes the steps of
  determining the overlapping area 14;
  calculating the cost grid for the overlapping area 14;
  finding an entry point (start point 18a) and an exit point (end point 18b) for the seam 16;
  finding the cheapest path from the entry point to the exit point through the cost grid;
  assigning blending values to the zones on both sides of the seam 16; and
  combining the images 10a, 10b according to blending values, so that the seam is substantially unnoticeable.

Where the terms "unit" or "element" are used herewith (for instance in "image processing unit", "generating unit", "selecting unit", "combining unit", "processing unit" or "memory element"), no restriction is made regarding how distributed the constituent parts of a unit or element may be and regarding how gathered units or elements may be. That is, the constituent parts of a unit or element may be distributed in different software or hardware components or devices for bringing about the intended function. A plurality of distinct units or elements may also be gathered for providing the intended functionalities.

The invention also relates to a computer program configured, when executed on a computer or programmable apparatus or device, to carry out the above-described method. The invention also relates to a computer program product storing such a computer program, to a computer-readable medium storing such a computer program, and to any memory storage device storing such a computer program.

Embodiments of the invention also include a:

(i) Device for selecting a seam between two overlapping images of an area of interest, the images defining an overlapping region, the device including a processing unit and a memory element, the memory element including a code section which, when loaded on the processing unit, executes thereon a generating procedure for generating a difference value associated with each portion of the overlapping region, wherein the difference value associated with a portion is derived from the difference between at least one property of the portion in the two images;
  a code section which, when loaded on the processing unit, executes thereon a selecting procedure for selecting, through the overlapping region, a path between two points located at the edge of the overlapping region based on the sum of the difference values of the portions along the path; and
  a code section which, when loaded on the processing unit, executes thereon setting the path as the seam.

(ii) Device of (i), wherein the difference value associated with a portion is any one of:
  the difference between the radiometric values of the portion in the two images;
  the difference between the gradient of the radiometric values at the portion in the two images; and
  a combination of the two preceding differences, (iii) Device of (i) or (ii), wherein the two points located at the edge of the overlapping region are each located at an intersection between the edges of the two images.

(iv) Device of (i), (ii) or (iii), wherein the selecting procedure includes selecting the path along which the sum of the difference values is the smallest or the smallest known.

(v) Device of (i), (ii), (iii) or (iv), wherein, in the selecting procedure, selecting a path between the two points is further based on any one of:
  the position in the overlapping region of the portions along the path;
  values associated with the portions or some of the portions along the path, wherein the values are coming from an external source; and
  a combination of the two preceding properties.

(vi) Device of {i), (iii), (iv) or (v), further for combining the two overlapping images into one image, the memory element further including a code section which, when loaded on the processing unit, executes thereon a combining procedure including combining the images along the seam.

(vii) Device of (vi), wherein the code section, when loaded on the processing unit, executes thereon the combining procedure that includes combining and blending the images along the seam.

(viii) Device for combining a set of overlapping images, the device including a processing unit and a memory element, the memory element including a code section which, when loaded on the processing unit, executes thereon a mosaicing procedure applied on the set including determining whether the set comprises exactly two images, and, if so, combining the two images into one image using a device of (vi) or (vii); and
  determining whether the set comprises more than two images, and, if so:
    (a) splitting the set into two subsets;
    (b) applying on each one of the two subsets the mosaicing procedure to obtain two images; and
    (c) combining the two obtained images into one image using a device of (vi) or (vii).

(ix) Device of (viii), wherein the mosaicing procedure applied on the set further includes determining whether the set comprises one image, and, if so, completing the mosaicing procedure applied on the set.

Although the present invention has been described on the basis of detailed examples, the detailed examples only serve to provide the skilled person with a better understanding, and are not intended to limit the scope of the invention. The scope of the invention is much rather defined by the appended claims.

What is claimed is:

1. A method for selecting a seam between two overlapping images of an area of interest and for combining the two overlapping images into one resulting image, an overlapping portion of the two overlapping images defining an overlapping region, the method comprising:
performing a generating procedure for generating a difference value associated with each portion of the overlapping region, wherein the difference value associated with each portion is derived from a difference between at least one property in corresponding portions of the two overlapping images;
performing a selecting procedure for selecting, through the overlapping region, a path between two points located at edges of the overlapping region based on a sum of those difference values associated with portions along the path, wherein the path is the seam and each of the two points are located at an intersection between edges of the two overlapping images;
performing a combining procedure for combining the two overlapping images along the seam; and
performing a blending procedure for blending portions of the overlapping region based on the difference value associated with each portion and a distance of each portion from the seam, wherein a portion of the overlapping region is said to be blended if a property of the portion in the resulting image results from a mix of the property in each of the corresponding portions of the two overlapping images.

2. The method of claim 1 wherein the difference value associated with each portion is at least one of:
a difference between radiometric values in corresponding portions of the two overlapping images;
a difference between a gradient of the radiometric values in corresponding portions of the two overlapping images; or
a combination of the two preceding differences.

3. The method of claim 1 wherein the selecting procedure includes selecting the path along which the sum of the difference values is the smallest or the smallest known.

4. The method of claim 1 wherein, in the selecting procedure, selecting the path between the two points is further based on at least one of:
a position in the overlapping region of the portions along the path;
values associated with at least some of the portions along the path, wherein the values are provided by an external source; or
a combination of the two preceding properties.

5. A method for combining a set of overlapping images, the method including:
a mosaicing procedure applied on the set including:
determining whether the set comprises exactly two images, and, if so, combining the two images into one image using the method of claim 1; and
determining whether the set comprises more than two images, and, if so:
(i) splitting the set into two subsets;
(ii) applying on each one of the two subsets the mosaicing procedure to obtain two images; and
(iii) combining the two obtained images into one image in accordance with the method of claim 1.

6. The method of claim 5 wherein the mosaicing procedure applied on the set further includes:
determining whether the set comprises one image, and, if so, completing the mosaicing procedure applied on the set.

7. An image processing unit configured to select a seam between two overlapping images of an area of interest and for combining the two overlapping images into one resulting image, an overlapping portion of the two overlapping images defining an overlapping region, the unit comprising:
a generating unit configured to generate a difference value associated with each portion of the overlapping region, the generating unit being configured so that the difference value associated with each portion is derived from a difference between at least one property in corresponding portions of the two overlapping images;
a selecting unit configured to select, through the overlapping region, a path between two points located at edges of the overlapping region based on a sum of those difference values associated with portions along the path, wherein each of the two points are located at an intersection between edges of the two overlapping images and the image processing unit is configured to set the path as the seam;
a combining unit configured to combine the two overlapping images along the seam; and
a blending unit configured to blend portions of the overlapping region based on the difference value associated with each portion and a distance of each portion from the seam, wherein a portion of the overlapping region is said to be blended if a property of the portion in the resulting image results from a mix of the property in each of the corresponding portions of the two overlapping images.

8. The image processing unit of claim 7 further configured so that the difference value associated with each portion is any one of:
a difference between radiometric values in corresponding portions of the two overlapping images;
a difference between a gradient of the radiometric values in corresponding portions of the two overlapping images; or
a combination of the two preceding differences.

9. The image processing unit of claim 7 wherein the selecting unit is further configured to include selecting the path along which the sum of the difference values is the smallest or the smallest known.

10. The image processing unit of claim 7 wherein the selecting unit is further configured to select the path between the two points based on any one of:
a position in the overlapping region of the portions along the path;
values associated with at least some of the portions along the path, wherein the values are provided by an external source; or
a combination of the two preceding properties.

11. An image processing apparatus configured to combine a set of overlapping images, the apparatus including:
a mosaicing unit configured to carry out a mosaicing procedure by:
taking as input the set;
determining whether the set comprises exactly two images, and, if so, combining the two images into one image using the image processing unit of claim 8; and
determining whether the set comprises more than two images, and, if so:

(i) splitting the set into two subsets;
(ii) applying on each one of the two subsets the mosaicing procedure to obtain two images; and
(iii) combining the two obtained images into one image using the image processing unit of claim 7.

12. The image processing apparatus of claim 11 wherein the mosaicing unit is further configured to determine whether the set comprises one image, and, if so, completing the mosaicing procedure applied on the set.

* * * * *